United States Patent [19]

Stillwagon, Jr.

[11] 3,962,889
[45] June 15, 1976

[54] LUBRICATED JOINT ASSEMBLY

[75] Inventor: George B. Stillwagon, Jr., Dayton, Ohio

[73] Assignee: Kenneth G. Fraser, Green Valley, Ariz. ; a part interest

[22] Filed: July 11, 1974

[21] Appl. No.: 487,720

[52] U.S. Cl. .............................. 64/32 F; 64/17 R; 64/26
[51] Int. Cl.² .......................................... F16D 3/84
[58] Field of Search .............. 64/17 R, 32 F, 26, 6

[56] References Cited
UNITED STATES PATENTS

| | | | |
|---|---|---|---|
| 2,264,728 | 12/1941 | Stillwagon, Jr. et al. | 64/32 F |
| 2,929,231 | 3/1960 | Bank | 64/26 |
| 3,423,959 | 1/1969 | Tate, Sr. et al. | 64/32 F |
| 3,795,118 | 3/1974 | Kesel et al. | 64/32 F |

FOREIGN PATENTS OR APPLICATIONS

| 709,117 | 5/1954 | United Kingdom | 64/32 F |
|---|---|---|---|

Primary Examiner—Samuel Scott
Assistant Examiner—Randall Heald
Attorney, Agent, or Firm—Dybvig & Dybvig

[57] ABSTRACT

A lubricated joint assembly comprises joint means received in a boot having cuffs which allow coupling members to connect between the joint means and external mechanisms. The boot cooperates with the coupling members to fully enclose the joint means. The boot is pressurized with a lubricant charged thereto whereby the boot is expanded and compresses the lubricant therein. In the preferred embodiments, the lubricant is charged to the boot in a fashion which displaces all air from the boot, thus preventing oxidation of the lubricant. Further, in the present invention, the external shape of the expanded boot is controlled by controlling the shape of the boot before pressurization thereof and by also controlling the wall thickness of the boot in selected areas thereof.

12 Claims, 11 Drawing Figures

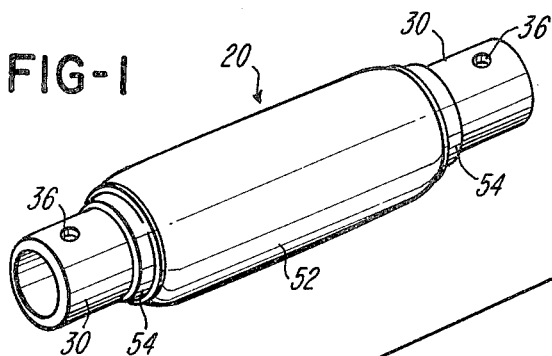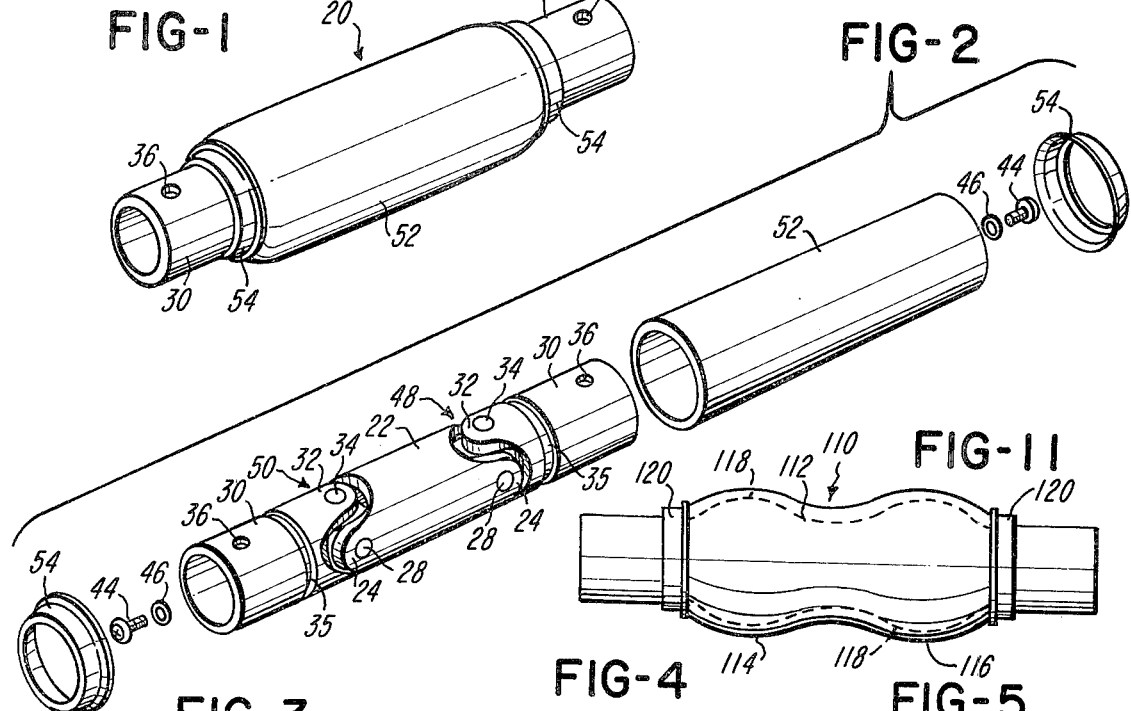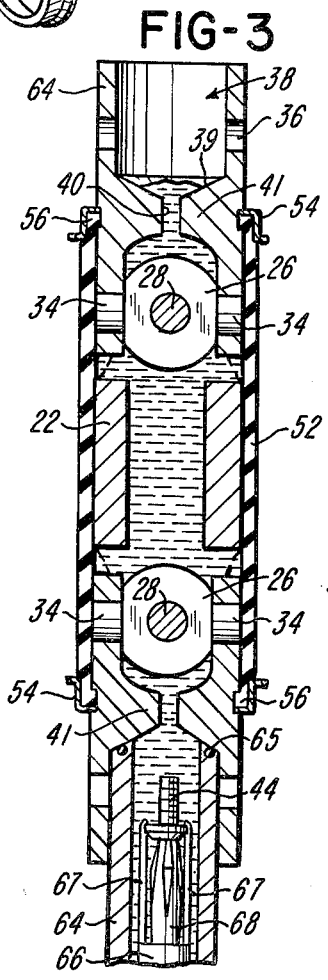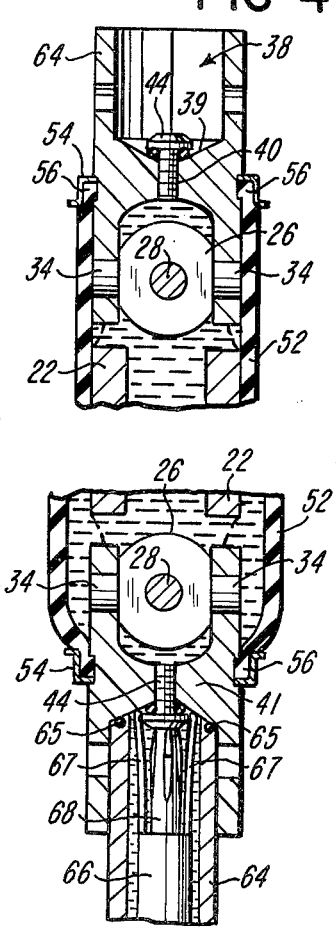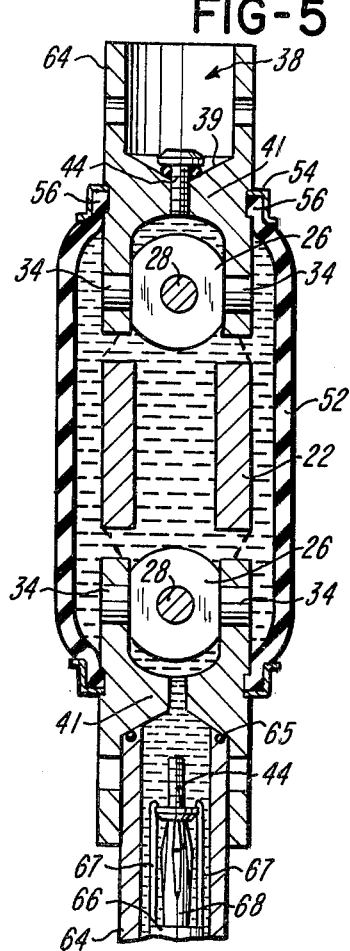

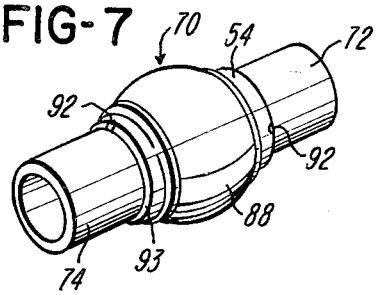
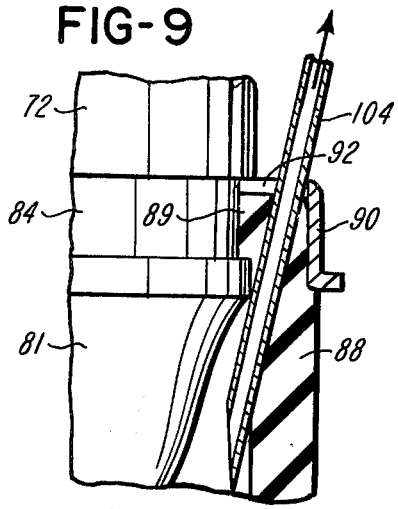
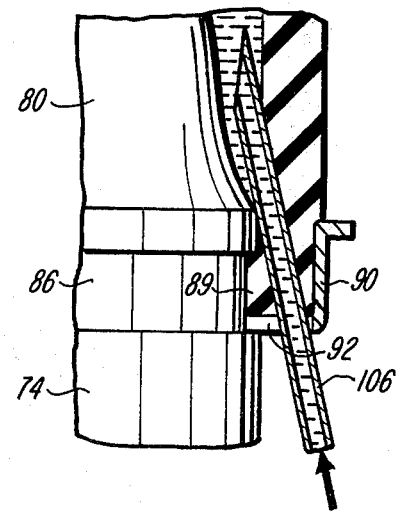
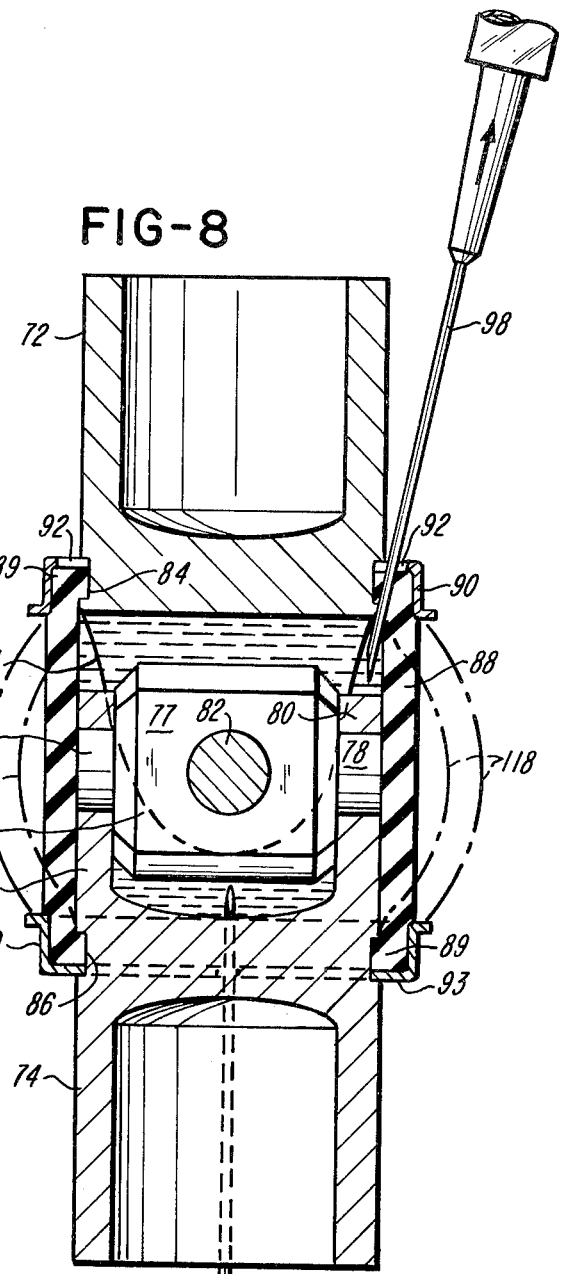

LUBRICATED JOINT ASSEMBLY

BACKGROUND OF THE INVENTION

1. Field of the Invention

The present invention relates to a lubricated joint and method of assembly, and more particularly to joint assemblies in which the lubricant which contacts the joint assembly is contained under pressure by an expanded boot.

2. Description of the prior art.

The following patents illustrate various means for protecting and lubricating universal joints: U.S. Pat. Nos. 1,433,130; 2,755,643; 1,922,431; 2,869,342; 2,097,424; 3,423,959.

3. Summary of the invention.

Two seemingly unrelated problems with prior art lubricated joint assemblies are solved with the present invention. One problem frequently encountered is that the lubricant cover or boot does not adequately protect the lubricant from the atmosphere and accordingly the lubricant tends to gel and harden over prolonged periods of time. Another problem is that the manufacturer of the lubricated joint assembly must maintain a large inventory of boot sizes and boot shapes to satisfy the specialized customer requirements.

In the present invention an elastic, air impervious boot is used and the filling of the boot with lubricant is accompanied by a removal of all air from the boot. The lubricant is introduced into the boot with a sufficient pressure above atmospheric pressure to cause the boot to expand and, in seeking to recover from such expansion, compress the lubricant. The result is a pressurized boot which minimizes the opportunity for contact between the lubricant and the atmosphere.

The use of an elastic boot provides the additional advantage that the final size and configuration of the pressurized boot can be determined by the volume of lubricant introduced under pressure to the interior of the boot, and by variations in the wall thickness of the boot.

An object of the present invention is to provide a new and improved lubricated joint assembly.

Another object of the present invention is to provide a new and improved method for lubricating joint assemblies.

A further object of the present invention is to provide an improved means for shaping boots for use in lubricated joint assemblies.

Still another object of the present invention is to provide an improved means for pressurizing lubricated joint assemblies.

BRIEF DESCRIPTION OF THE DRAWINGS

In the drawings,

FIG. 1 is a perspective view of a lubricated joint assembly constructed in accordance with the present invention.

FIG. 2 is an exploded perspective view illustrating the construction of the joint assembly of FIG. 1 prior to lubrication thereof.

FIG. 3 is a section view of the joint assembly of FIG. 1 illustrating an intermediate stage in the fabrication of the joint assembly.

FIG. 4 is a fragmentary section view of the joint illustrating a further stage in the fabrication of the joint assembly.

FIG. 5 is a section view of the joint illustrating still another stage in the fabrication of the joint assembly.

FIG. 6 is a fragmentary section view of the joint illustrating still another stage in the fabrication of the joint assembly.

FIG. 7 is a perspective view of a modification.

FIG. 8 is a section view of the modification partially illustrating one mode by which the modification may be charged with a lubricant.

FIGS. 9 and 10 partially illustrate another mode for charging the modification with a lubricant.

FIG. 11 is a side elevation view of a second modification.

DESCRIPTION OF THE PREFERRED EMBODIMENTS

FIG. 1 illustrates a lubricated universal joint assembly 20 constructed in accordance with the present invention.

FIG. 2 illustrates the same joint assembly in exploded detail. The joint assembly comprises an extension member 22 having diametrically disposed jaws 24 at each end thereof. Referring to the right hand end of the extension member 22, as it appears in FIG. 2, the jaws 24 are bored to journal a shaft 28 extending therebetween. The shaft 28 supports a generally cylindrical load bearing element 26, best seen in FIG. 3. Element 26 is sized axially to closely fit between the jaws 24.

The bearing element 26 is also sized with diametrically opposite flat surfaces to fit between the jaws 32 of a universal joint coupling member 30. Radially disposed bores into the aforementioned flat surfaces receive stub shafts 34 which are press fitted or otherwise secured within the element 26. The stub shafts 34 are journaled in suitable apertures in the jaws 32. By the described construction the coupling member 30 is allowed universal motion, within limits, with respect to the extension member 22.

The coupling member 30 is provided with diametrically disposed apertures 36 for use in coupling the universal joint to any desired driving or driven structure, not shown. Between the apertures 36 and the jaws 32 the coupling member 30 has an annular groove 35 whose purpose will be described later.

The foregoing description with reference to the joint assembly which is to the right of the extension member 22 applies equally to a duplicate assembly which is to the left of the extension member 22. For convenience the universal joint assembled to the right in FIG. 2 has been identified generally by the reference number 48 and the duplicate universal joint assembled to the left of the extension member 22 is designated by the reference number 50, corresponding parts of both joint assemblies being given the same reference numbers.

AS appears in FIG. 3, the coupling member 30 is formed or bored to have a central cavity 38 at its outer end. The base 39 of the cavity 38 has a 120° included angle.

The base 39 is the upper surface of a partition 41 which separates the cavity 38 from the bearing element 26. For reasons to become apparent, the partition 41 has a threaded bore 40 therethrough, thus to establish passage between the cavity 38 and the bearing element 26. As suggested in FIG. 2, a threaded screw 44 encircled by an O-ring 46 which is smaller in diameter than the screw head will ultimately plug the bore 40.

After completion of the universal joint assembly, except for the screws 44 and the O-rings 46, a boot or sleeve 52 is slided onto the joint assembly so as to cover the parts of the joint assembly which are disposed between the annular grooves 35 located toward each end of the assembly. Ferrules 54 sized to closely fit the ends of the boot 52 are then placed over the ends and, by a conventional swaging or reducing operation, not shown, the ferrules are reduced in diameter so as to press the ends of the boot radially inwardly toward the annular grooves 35, thus forming cuffs 56 at the ends of the boot which tightly seal the boot to the coupling member 30. The resulting assembly appears in section in FIG. 3. FIG. 3 also illustrates one step in a method by which the universal joint can be lubricated in accordance with the present invention.

Thus FIG. 3 illustrates a nozzle 64 which is connected to any suitable pressurized source of lubricant, not shown. The nozzle 64, which is a generally cylindrical tube has its end wall beveled at a 60° angle with respect to the axis of the nozzle so as to provide a 120° included angle which can interfit the base 39 for the cavity 38 in either of the universal joints 48 and 50. The end wall of the nozzle 64 is also provided with an annular channel for receiving an O-ring 65. Accordingly, when the nozzle 64 is pressed upwardly against one of the bases 39 to the position shown in FIG. 3, a lubricant may be delivered through the nozzle and the threaded bore 40 thereabove to the interior of the boot 52.

For the purpose of introducing the lubricant, the joint assembly is placed in a vertical position with one of the universal joints, such as the joint 48, positioned vertically above the other universal joint 50. Suitable mechanism, not shown, is employed to advance a screw driver 68 upwardly through the center of the nozzle 64. Mounted slidably on the shank of the screwdriver 68 is a collar 66 having upstanding hooks 67 which cooperate to support one of the screws 44 in engagement with the screwdriver. An O-ring 46 is positioned about the shank of the screw 44. The screw is thus supported within the nozzle 64 in readiness for a threaded entry into the bore 40 thereabove.

Lubricant is now introduced upwardly through the bore 40 of the universal joint 50. While rising upwardly, the lubricant, which is preferably a low viscosity oil or grease, flows laterally so as to displace all air from within the universal joint 50. The displaced air advances upwardly toward the universal joint 48 and out the bore 40 in the universal joint 48. Such injection of lubricant is continued until all air within the universal joint assembly is displaced upwardly through the bore 40 by the lubricant. As soon as lubricant appears in the cavity 38 of the joint 48, the introduction of lubricant through the nozzle 64 is temporarily discontinued.

Using a screwdriver assembly having a screw retaining means such as described with reference to FIG. 3, a second screw 44 having its shank surrounded by a second O-ring 46 is threaded into the bore 40 of the universal joint 50, as shown in FIG. 4, and torqued firmly to prevent any further upward movement of the lubricant.

With all air thus purged from the joint assembly, further lubricant is introduced through the nozzle 64. Inasmuch as the lubricant is free of air and thus essentially incompressible, the introduction of further lubricant into the joint assembly can be accommodated only by an expansion or distention of the boot 52. Such expansion is illustrated in FIG. 5. The expansion illustrated is that encountered when the boot 52 has been ground so as to have a uniform wall thickness throughout its length.

The extent of expansion of the boot 52 is ordinarily controlled to meet the customer's requirements or limitations as to the boot diameter. When the boot has expanded to the desired size, the flow of lubricant through the nozzle 64 is interrupted without relieving the pressure within the boot 52. The screwdriver 68 is then actuated to drive the screw 44 upwardly and then torqued sufficiently to positively seal the lubricant within the joint assembly. The nozzle 64 as well as the screwdriver 68 and its screw support means are then removed from the cavity 38. The resulting product is as illustrated in FIG. 1.

A unique advantage that results from the use of lubricant to support the boot in an expanded condition is that the boot, in seeking to recover its original shape, places itself in compression adjacent the surface thereof which contacts the lubricant. Those skilled in the art readily understand that all elastic materials are permeable by gasses and vapors to at least some extent. The compression of the boot material in the present invention that results from boot expansion by reason of the lubricant placed therein functions to minimize such permeation. Furthermore, it is to be noted that the lubricant itself is compressed to a pressure greater than that of the ambient atmosphere. As a result, any migration of atmospheric gasses into the boot is resisted by the pressure barrier presented by the lubricant within the boot.

A modified joint structure 70 is illustrated in FIG. 7. The joint structure 70 comprises a lubricated single universal joint as opposed to the double universal joint described with reference to FIGS. 1 – 6. As best appears in FIG. 8, the modified joint structure comprises a first coupling member 72 and a second coupling member 74. The coupling member 74 has jaws 80 which embrace a bearing element 76 similar to the bearing element 26 described in reference to the preferred embodiment. The bearing element 76 is thus a generally cylindrical member sized longitudinally to enter between the jaws 80 of the coupling member 74. Stub shafts 78 are press fitted or otherwise secured within the body of the bearing member 76 so as to enter suitable apertures in the jaws 80 of the coupling member 74.

The bearing member 76 also has diametrically opposite flats 77, only one of which appears in FIG. 8, which are spaced for entry of the bearing member between the jaws 81 of the coupling member 72. The bearing member is journaled for rotation between the jaws 81 by means of a shaft 82 passing through the body of the bearing member and received in suitable apertures in the jaws 81 for the coupling member 72.

The coupling member 72 is provided with an annular groove 84 located adjacent its jaws 81 and likewise the coupling member 74 has an annular groove 86 located adjacent its jaws 80. A hollow cylindrical boot 88 is slided over the jaws of the coupling members 72 and 74 so that its ends lap over the grooves 84 and 86.

Ferrules 90 sized to closely fit the ends of the boot 88 are swaged or reduced radially inwardly to form cuffs 89 at the ends of the boot 88. The ferrules 90 differ from the ferrules 54 of the preferred embodiment by reason of the presence, in each, of notches 92 located in a radially disposed annular wall 93 of each ferrule 90. As evident in FIG. 7, the notches are small in relation to the circumference of the wall 93 so as not to significantly reduce the structural strengths of the ferrules. Each ferrule 90 has two diametrically disposed notches 92. For reasons to be described, the notches in one ferrule are displaced from the notches in the other ferrule approximately 90° about an axis through the connecting members 72 and 74.

As illustrated in FIG. 8, the notches 92 in the ferrule 90 which surrounds the coupling member 72 permit the entry of a hypodermic needle or cannula 98 through the cuff region of the sleeve 88 which surrounds the coupling member 72. Thus the hypodermic needle 98 when forced through the end of the boot 88 at an appropriate angel gains access to the interior of the boot 88.

A second hypodermic needle 102 is pressed into the end of the boot surrounding the coupling member 74. It will be noted that the hypodermic needle 98 is generally in the plane of the drawing whereas the hypodermic needle 102 is generally in a plane perpendicular to the plane of the drawing. This arrangement has allowed the hypodermic needle 98 to enter the end of the boot 88 so as to pass into a region which is between the jaws 81. Likewise the hypodermic needle 102 passes through the end of the boot 88 into a region disposed between the jaws 80.

The hypodermic needle 102 has a pressure generating mechanism 100 associated therewith for the purpose of introducing a lubricant to the interior of the boot 88. As lubricant enters the boot, air is displaced upwardly from the interior of the boot 88 through the needle 98.

The lubricant is continuously charged into the interior of the boot 88 until lubricant passes into the needle 98, care being taken to so position the needle 98 that substantially all air will be displaced from the interior of the boot 88.

With the boot 88 fully charged with lubricant and substantially all air removed therefrom, the needle 98 is withdrawn from the boot 88. Due to the fact that the needle was inserted through a cuff of the boot where compressed by a ferrule, the puncture through the end of the boot 80 produced by entry of the needle 98 abruptly closes upon removal of the needle.

With the needle 98 removed and its puncture closed for the reason described, additional lubricant is forced to enter the interior of the boot 80 by means of the mechanism 100 so as to expand the boot 88 to any desired diameter. When the boot has reached a desired dimension such as illustrated by the broken lines 102 in FIG. 8, the needle 102 is removed without reducing the pressure applied by the syringe 100. As previously described, pressures acting on the boot at its penetrated cuff region abruptly seal the boot 88, which retains its shape by reason of the lubricant residing therein. It will be noted, of course, that the boot 88, being expanded away from its natural shape, possesses a tension therethrough which serves to compress the lubricant residing in the boot 88.

FIGS. 9 and 10 illustrate an alternate mode for charging lubricant into the boot 88. FIG. 9 schematically illustrates a needle 104 inserted through the notch 92 of a ferrule 90 so as to penetrate the cuff portion of the boot 88. Evacuation means, not illustrated, are connected to the needle 104 for the purposes of evacuating air within the boot 88 to a suitably low pressure.

FIG. 10 illustrates a second needle 106 connected to a lubricant supply, not shown, and penetrating a notch 92 in a ferrule 90 to enter the cuff portion of the boot 88, thus to deliver lubricant to the interior of the boot. Due to the evacuation of air from the boot as illustrated in FIG. 9, the boot will quickly fill with the lubricant without additional pressure being supplied by a syringe or the like; however, the lubricant supply for the needle 106 is adapted to be pressurized by any suitable means, not shown, so as to expand the boot 88 to any desired diameter. It will be noted, of course, that the final result whether using the method of FIG. 8 or the method of FIGS. 9 and 10 is essentially the same, it being unimportant whether air is removed by evacuation or displacement.

In practicing the method of FIGS. 9 and 10, it has been found that the sealing of the portions of the boot penetrated by needles occurs so abruptly and is of such a permanent nature that it is possible to evacuate boots in accordance with the present invention for prolonged storage before lubricant is admitted to the boot by use of a hypodermic needle as described.

FIG. 11 illustrates a modification wherein a joint assembly 110 of any arbitrary design is surrounded by a boot 112 sealingly joined to portions thereof. As in the previously described embodiments the boot 112 has been expanded by the introduction thereto of a quantity of lubricant which supports the boot in its expanded condition.

In the previously described embodiments the boots each had the initial shape of a hollow cylinder with a uniform wall thickness throughout the length thereof. In the embodiment of FIG. 11, the boot 112 has been formed with a reduced wall thickness adjacent each end thereof with the result that upon pressurization by a lubricant charged thereto, the portions of the boot which have a reduced thickness are expanded to a greater diameter, thus producing bulges 114 and 116 in the outer periphery of the boot. The broken lines 118 approximately illustrate the variation in wall thickness throughout the length of the boot and it can be noted that the central portion of the boot between the bulges 114 and 116 has approximately the same wall thickness as the cuffs of the boot which have been surrounded by ferrules 120.

A boot such as illustrated in FIG. 11 may be required to meet customer specifications as to the external configuration of the boot or to provide enlarged clearance within the boot for the joint mechanism enclosed thereby.

An important consequence of the embodiment shown in FIG. 11 is that a manufacturer may equip himself with an inventory of standard boots having uniform wall thickness and then, as customer requirements necessitate, grind or otherwise adjust the wall thickness of the boots to satisfy customer requirements. Thus FIG. 11 is merely representative of a wide variety of internal and external configurations that may be accomplished by means of the invention described in this application.

The composition of the boots described in this application is not considered critical except, of course, that at least part of the boot must be capable of elastic expansion for the purposes herein described. Thus, the boot may comprise any suitably elastic natural or synthetic rubber or plastic material.

Although the preferred embodiments of this invention have been described, it will be understood that various changes may be made within the scope of the appended claim.

Having thus described my invention, I claim:

1. In a lubricated joint assembly of the type comprising a torque transmitting joint mechanism enclosed by boot means containing a lubricant, said boot means sealingly engaged to said joint mechanism, the improvements wherein said boot means comprises an elastic material, wherein said lubricant supports said boot means in an expanded condition whereby said boot means compresses said lubricant, and wherein no substantial amount of gas resides in said boot means.

2. In a lubricated joint assembly of the type comprising a torque transmitting joint mechanism enclosed by boot means containing a lubricant, said boot means having openings therein through which coupling members connect to said joint mechanism, and said boot means having cuff means sealed to said coupling members to confine said lubricant, the improvements wherein said boot means comprises an elastic material, wherein said lubricant supports said boot means in an expanded condition whereby said boot means compresses said lubricant, and wherein no substantial amount of gas resides in said boot means.

3. The lubricated joint assembly of claim 2 wherein said boot means comprises a hollow cylinder of said elastic material, and wherein said lubricant supports said boot means in an outwardly bulged condition.

4. The lubricated joint assembly of claim 2 in which one of said coupling members has a passage therethrough communicating to the interior of said boot means, and including removable means closing said passage.

5. The joint assembly of claim 2 wherein said coupling members each have an annular groove thereabout, and including ferrules pressing said cuff means into said annular grooves.

6. The joint assembly of claim 5 wherein at least one of said ferrules has a notch therein exposing a part of said cuff means.

7. In combination, a torque transmitting joint assembly having coupling members extending therefrom, a hollow cylindrical boot of elastic material surrounding said joint assembly and having its ends lapped over said coupling members, means pressing the ends of said boot against said coupling members, and lubricant means disposed within said boot to the exclusion of air and supporting said boot in an expanded condition whereby said boot compresses said lubricant.

8. The combination of claim 7 in which said coupling members, where lapped by said boot, are generally cylindrical, and said means compressing said boot against said coupling members comprise generally circular ferrules.

9. In a joint assembly of the type comprising a torque transmitting joint mechanism protected by boot means sealingly engaged to said joint mechanism, the improvement wherein said boot means comprises an elastic material, and including lubricant means disposed within said boot means to the exclusion of air and supporting said boot means in an expanded condition whereby said boot means compresses said lubricant means.

10. In a lubricated joint assembly of the type comprising a joint mechanism enclosed by boot means containing a lubricant, said boot means having openings therein through which coupling members connect to said joint mechanism, and said boot means having cuff means sealed to said coupling members to confine said lubricant, the improvements wherein said boot means comprises an elastic material, wherein said lubricant supports said boot means in an expanded condition whereby said boot means compresses said lubricant, and wherein said boot means comprises a hollow generally cylindrical body of elastic material, a first portion of said body having a wall thickness smaller than the wall thickness of a second portion of said body, and wherein said lubricant supports said boot means in an outwardly bulged condition, the outward bulge of said first portion greater than the outward bulge of said second portion.

11. In a lubricated joint assembly of the type comprising a joint mechanism enclosed by boot means containing a lubricant, said boot means having openings therein through which coupling members connect to said joint mechanism, and said boot means having cuff means sealed to said coupling members to confine said lubricant, the improvements wherein said boot means comprises an elastic material, wherein said lubricant supports said boot means in an expanded condition whereby said boot means compresses said lubricant, and wherein said boot means comprises an annular body of said elastic material, a first portion of said annular body having a first wall thickness and a second portion of said annular body having a second wall thickness whereby the expansion of said boot means by lubricant charged thereto differs in degree as between said first and second areas.

12. The lubricated joint assembly of claim 11 wherein said first portion extends annularly about said boot means.

* * * * *